(12) United States Patent
Snyder et al.

(10) Patent No.: US 8,608,521 B1
(45) Date of Patent: Dec. 17, 2013

(54) MISSION-BASED SYSTEMS AND METHODS FOR OPERATING HYBRID PROPULSION SYSTEMS FOR MARINE VESSELS

(75) Inventors: Matthew W. Snyder, Fond du Lac, WI (US); Aaron J. Ward, Oshkosh, WI (US); Jason S. Arbuckle, Horicon, WI (US)

(73) Assignee: Brunswick Corporation, Lake Forest, IL (US)

( * ) Notice: Subject to any disclaimer, the term of this patent is extended or adjusted under 35 U.S.C. 154(b) by 276 days.

(21) Appl. No.: 13/100,037

(22) Filed: May 3, 2011

(51) Int. Cl.
*B63H 21/22* (2006.01)
(52) U.S. Cl.
USPC ............. 440/1; 440/3; 440/6; 440/84; 701/21
(58) Field of Classification Search
USPC .................. 440/1, 3, 6, 84; 701/21
See application file for complete search history.

(56) References Cited

U.S. PATENT DOCUMENTS

| | | |
|---|---|---|
| 1,332,631 A | 3/1920 | Morse |
| 3,230,698 A | 1/1966 | Nettles |
| 3,503,464 A | 3/1970 | Yardney |
| 3,566,717 A | 3/1971 | Baruch Berman et al. |
| 3,650,345 A | 3/1972 | Yardney |
| 3,703,642 A | 11/1972 | Balaguer |
| 3,888,325 A | 6/1975 | Reinbeck |
| 4,233,858 A | 11/1980 | Rowlett |
| 4,338,525 A | 7/1982 | Kilgore |
| 5,080,064 A | 1/1992 | Buslepp et al. |
| 5,081,365 A | 1/1992 | Field et al. |
| 5,301,764 A | 4/1994 | Gardner |
| 5,616,056 A * | 4/1997 | Meissner .......................... 440/3 |
| 5,835,876 A | 11/1998 | Hathaway et al. |
| 5,848,582 A | 12/1998 | Ehlers et al. |
| 5,880,575 A | 3/1999 | Itou et al. |
| 5,969,624 A | 10/1999 | Sakai et al. |
| 6,009,371 A | 12/1999 | Kobayashi |
| 6,133,707 A | 10/2000 | Kikuchi et al. |
| 6,396,161 B1 | 5/2002 | Crecelius et al. |
| 6,443,286 B1 | 9/2002 | Bratel et al. |

(Continued)

FOREIGN PATENT DOCUMENTS

DE     101 53 586 A1    5/2002
DE     103 18 293 A1    11/2004

OTHER PUBLICATIONS

European Search Report for corresponding application EP 11 25 0074, having a completion date of May 31, 2011.

(Continued)

*Primary Examiner* — Lars A Olson
(74) *Attorney, Agent, or Firm* — Andrus, Sceales, Starke & Sawall, LLP

(57) ABSTRACT

Systems and methods of operating a marine propulsion system utilize an internal combustion engine and an electric motor that is powered by a battery, wherein the internal combustion engine and the electric motor each selectively power a marine propulsor to propel a marine vessel. A control circuit is operated to control operation of the system according to a plurality of modes including at least an electric mode wherein the electric motor powers the marine propulsor and a hybrid mode wherein the internal combustion engine powers the marine propulsor and provides power for recharging the battery. An operator-desired future performance capability of the hybrid marine propulsion system is input to the control circuit, which selects and executes the plurality of modes so as to provide the operator-desired desired future performance capability.

24 Claims, 8 Drawing Sheets

(56) References Cited

U.S. PATENT DOCUMENTS

| | | |
|---|---|---|
| 6,554,088 B2 | 4/2003 | Severinsky et al. |
| 6,587,765 B1 | 7/2003 | Graham et al. |
| 6,701,890 B1 | 3/2004 | Suhre et al. |
| 6,757,606 B1 | 6/2004 | Gonring |
| 6,758,198 B1 | 7/2004 | Suhre et al. |
| 6,800,004 B1 | 10/2004 | White et al. |
| 6,821,171 B1 | 11/2004 | Wynveen et al. |
| 6,857,918 B1 | 2/2005 | Lebreux et al. |
| 6,882,129 B2 | 4/2005 | Boskovitch et al. |
| 6,885,919 B1 | 4/2005 | Wyant et al. |
| 6,915,781 B2 | 7/2005 | Rayl |
| 6,919,711 B2 | 7/2005 | Haydock et al. |
| 6,978,617 B2 | 12/2005 | Goldmeer et al. |
| 7,147,523 B2 * | 12/2006 | Mori et al. ............... 440/3 |
| 7,241,192 B2 * | 7/2007 | Andersen et al. ............ 440/1 |
| 7,296,648 B2 | 11/2007 | Tatara et al. |
| 7,318,396 B1 | 1/2008 | Belter et al. |
| 7,473,149 B2 * | 1/2009 | Mizokawa ............... 440/6 |
| 7,518,344 B2 | 4/2009 | Sihler |
| 7,530,864 B2 | 5/2009 | Kaji |
| 7,556,547 B2 | 7/2009 | Kaji |
| 7,565,939 B2 | 7/2009 | Ando et al. |
| 7,621,789 B2 | 11/2009 | Mizokawa |
| 7,769,504 B2 * | 8/2010 | Kaji ............... 701/21 |
| 7,862,393 B2 * | 1/2011 | Levander et al. ............ 440/3 |
| 8,039,976 B2 | 10/2011 | Sato et al. |
| 8,062,081 B2 | 11/2011 | Barrett et al. |
| 2004/0163861 A1 | 8/2004 | Fukuda et al. |
| 2005/0106953 A1 | 5/2005 | Andersen et al. |
| 2006/0025025 A1 | 2/2006 | Kitani et al. |
| 2006/0040791 A1 | 2/2006 | Nakajima et al. |
| 2006/0096555 A1 | 5/2006 | Buck |
| 2006/0166573 A1 | 7/2006 | Vetta et al. |
| 2008/0120516 A1 | 5/2008 | Thor |
| 2009/0156068 A1 | 6/2009 | Barrett et al. |
| 2009/0284228 A1 | 11/2009 | Kumar |
| 2009/0288896 A1 | 11/2009 | Ichikawa |
| 2010/0105259 A1 | 4/2010 | Wejrzanowski et al. |
| 2010/0123436 A1 | 5/2010 | Herrod et al. |
| 2010/0144219 A1 | 6/2010 | Balogh et al. |
| 2010/0250041 A1 | 9/2010 | Li |
| 2011/0195618 A1 | 8/2011 | Arbuckle et al. |

OTHER PUBLICATIONS

Web Page for PowerCharge Battery Charger HV Series—Overview; http://www.powerdesignersusa.com/powercharge_hv.htm, last visited Jan. 27, 2011 (one page).

Web Page for PowerCharge Battery Charger HV Series—Specifications; http://www.powerdesignersusa.com/powercharge_hv_specs.htm, last visited Jan. 27, 2011 (two pages).

Brochure Page for PowerCharge Battery Charger HV Series and PowerCharge HV Series Product Matrix (two pages).

European Search Report for corresponding application EP 11 25 00118, having a completion date of Jun. 28, 2012.

* cited by examiner

US 8,608,521 B1

MISSION-BASED SYSTEMS AND METHODS FOR OPERATING HYBRID PROPULSION SYSTEMS FOR MARINE VESSELS

FIELD

The present disclosure relates to marine vessels, and particularly to propulsion systems and methods for marine vessels.

BACKGROUND

Abandoned U.S. patent application Ser. No. 11/505,075, expressly incorporated herein in entirety by reference, discloses hybrid marine propulsion systems that connect both an internal combustion engine and an electric motor to a propeller in torque-transmitting relation so that the propeller can selectively receive torque provided by the engine, torque provided by the motor, and a sum of the torque provided by the engine and the motor.

U.S. patent application Ser. No. 12/910,495, expressly incorporated herein in entirety by reference, discloses hybrid marine propulsion systems and methods of operating the systems to allow an operator of a marine vessel to selectively boost power provided to such hybrid marine propulsion systems.

U.S. patent application Ser. No. 12/849,549, expressly incorporated herein in entirety by reference, discloses scalable marine propulsion systems wherein one or more batteries can be added or removed from a plurality of batteries already connected to the system without negatively affecting operation of the plurality of batteries or the remaining components of the system.

SUMMARY

The present disclosure provides hybrid marine propulsion systems and methods of operating these systems in which one or more electric motors and one or more internal combustion engines are configured to alternately or simultaneously provide power to a propulsor of a marine vessel. More specifically, the present disclosure provides systems and methods for selectively powering marine propulsion systems having one or more electric motors only, one or more internal combustion engines only, and a combination of one or more motors and one or more engines.

During experimentation and testing of the above-described systems and methods, the present inventors have realized that it would be beneficial to provide improved hybrid marine propulsion systems and methods of operating such systems that optimize the use of fuel and electricity, to thereby achieve environmental advantages and/or economic advantages. For example, although the hybrid marine propulsion systems described in the above-incorporated patent applications provide for switching between various operational modes, the inventors have realized that simply using the most readily available or least expensive mode at any given time may not necessarily achieve the most efficient and/or least expensive output of the system over a period of time. With this realization, the present inventors invented the systems and methods disclosed herein, which account for and achieve one or more operator-desired future performance capabilities of hybrid marine propulsion systems.

In one example, a hybrid propulsion system for a marine vessel comprises a marine propulsor that propels a marine vessel; an internal combustion engine that selectively powers the marine propulsor; an electric motor that selectively powers the marine propulsor, wherein the electric motor receives power from at least one battery; a control circuit that controls operation of the system according to a plurality of modes comprising an electric mode wherein the electric motor powers the marine propulsor and a hybrid mode wherein the internal combustion engine powers the marine propulsor and provides power for recharging the battery; and a user input device that inputs to the control circuit an operator-desired future performance capability of the system; wherein the control circuit selects and executes modes of the plurality of modes so as to provide the operator-desired future performance capability. In several examples disclosed herein, the future performance capability comprises a future state of charge of the battery.

In another example, a method is provided for operating a marine propulsion system having an internal combustion engine and an electric motor that is powered by a battery, wherein the internal combustion engine and the electric motor each selectively power a marine propulsor to propel a marine vessel. The method comprises operating a control circuit to control operation of the system according to a plurality of modes including at least an electric mode wherein the electric motor powers the marine propulsor and a hybrid mode wherein the internal combustion engine powers the marine propulsor and provides power for recharging the battery; inputting to the control circuit an operator-desired future performance capability of the hybrid marine propulsion system; and selecting and executing with the control circuit the plurality of modes so as to provide the operator-desired desired future performance capability.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
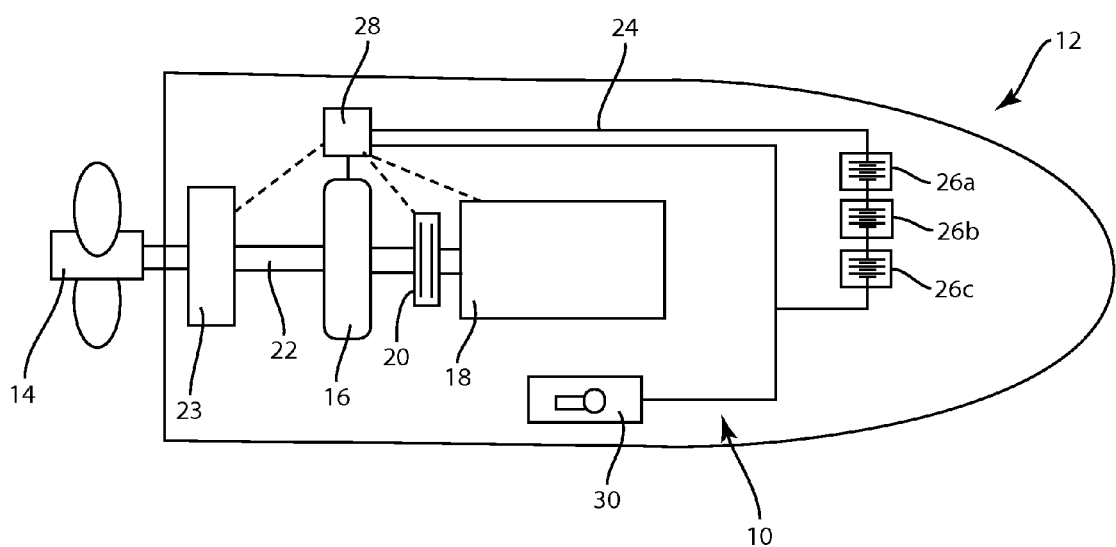
FIG. 1 is a schematic view of an exemplary marine vessel and propulsion system.

FIG. 1 depicts a hybrid marine propulsion system 10 for a marine vessel 12. The system 10 includes among other things one or more propulsors 14 (collectively referred to herein as "propulsor"), which can include any type of device for propelling the marine vessel 12 including but not limited to one or more propellers (as shown in FIG. 1), impellers, stern drives, pod drives, and/or the like. The propulsor 14 is selectively driven by one or more electric motors 16 (collectively referred to herein as "motor"), one or more internal combustion engines 18 (collectively referred to herein as "engine"), and a combination of the electric motor 16 and engine 18. In the example shown, the system 10 also includes one or more clutches 20 (collectively referred to herein as "clutch") for selectively connecting and disconnecting the engine 18 from a driveshaft 22 that extends from the engine 18 to a transmission 23 for driving the propulsor 14. The engine 18 can include a diesel engine or any other type of engine for providing power to the propulsor 14. The clutch 20 can include any type of clutch for connecting and disconnecting the engine 18 and driveshaft 22, such as for example a friction clutch, or more preferably a dog clutch because the speeds of the motor 16 and engine 18 are typically synchronized (i.e. substantially matched) before the clutch 20 is engaged or disengaged.

The motor 16 is located between the clutch 20 and transmission 23 and is configured to drive driveshaft 22 at the same time or separately from the engine 18. In the example shown, the driveshaft 22 extends through and forms a part of the motor 16; however, arrangements where the motor 16 and driveshaft 22 are oriented differently with respect to each other or are separate components that are operatively connected are also contemplated and are part of this disclosure. Together, the engine 18, clutch 20, motor 16 and transmission 23 provide forward, neutral, and reverse operations of the propeller 14 in a "parallel" drive arrangement; however it should be recognized that the examples shown and described are not limiting and that the concepts discussed and claimed herein are applicable to other types of parallel and non-parallel hybrid marine propulsion configurations.

The system 10 further includes a plurality of rechargeable storage batteries 26a, 26b, 26c, which are connected in electrical communication with the motor 16 and discharge current to power the motor 16. In FIG. 1, three batteries 26a, 26b, 26c are shown connected in series with each other and to system 10; however the number of batteries 26 and the configuration thereof can vary from that shown. One or more batteries could be employed.

In one exemplary arrangement, the motor 16 is also operable as a generator to recharge the batteries 26. In this mode, referred to hereinbelow as Hybrid Regeneration Mode, the motor 16 is connectable in torque transmitting relation with, and driven by, the engine 18, which in turn provides a supply of current for recharging batteries 26a, 26b, 26c. However, the motor 16 does not need to provide the generation source for the batteries and an alternate generator that receives power from the engine could be employed.

Figure 2:
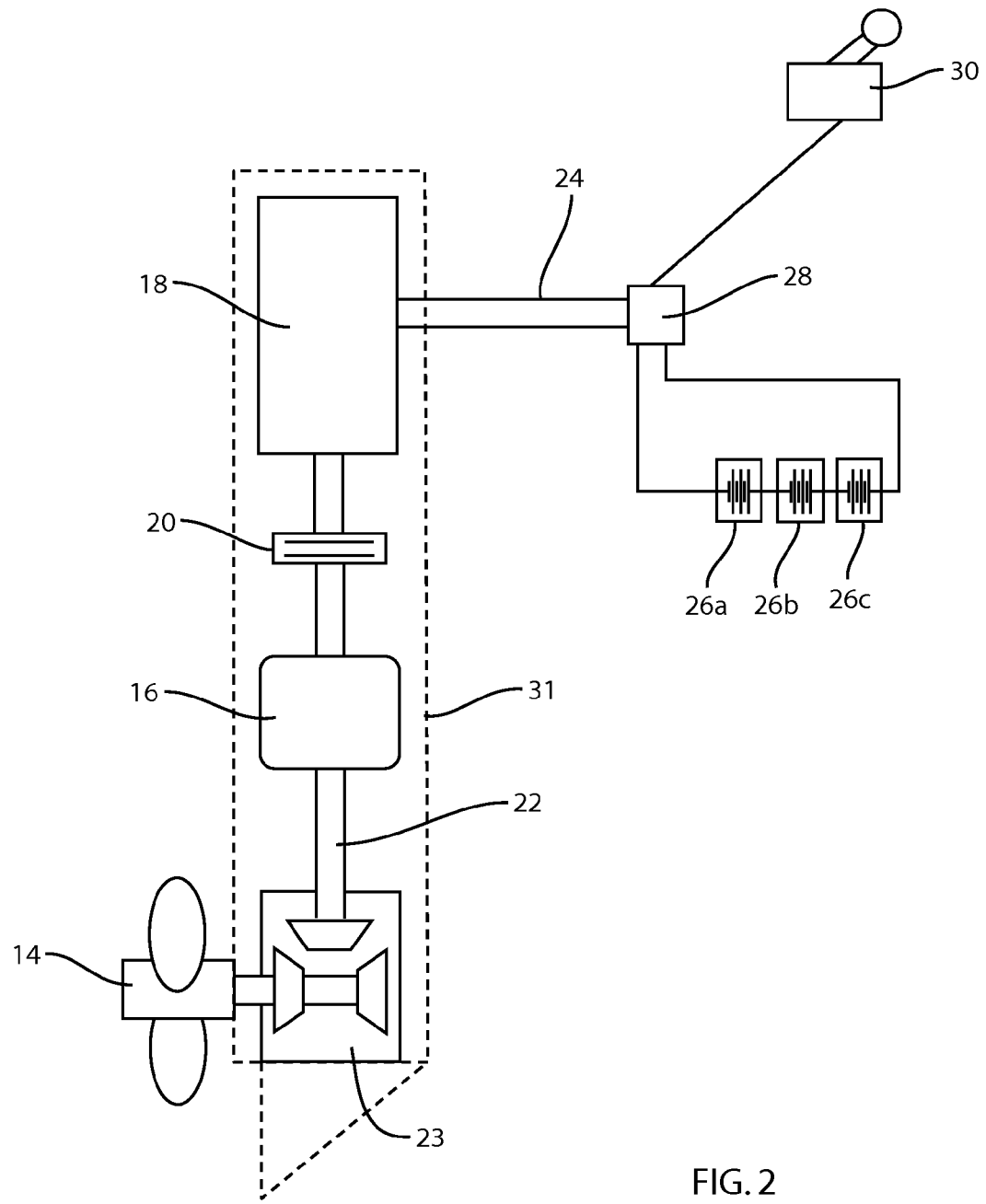
FIG. 2 is a schematic view of another exemplary marine vessel and propulsion system.

FIG. 1 depicts an inboard/outboard marine arrangement; however the concepts disclosed in this application are applicable to any type of marine propulsion system, such as for example an outboard motor arrangement. FIG. 2 depicts an outboard motor 31 according to such an arrangement, having reference numbers corresponding to the structures described with reference to FIG. 1. The principles disclosed above equally apply to the configuration shown in FIG. 2.

Figure 3:
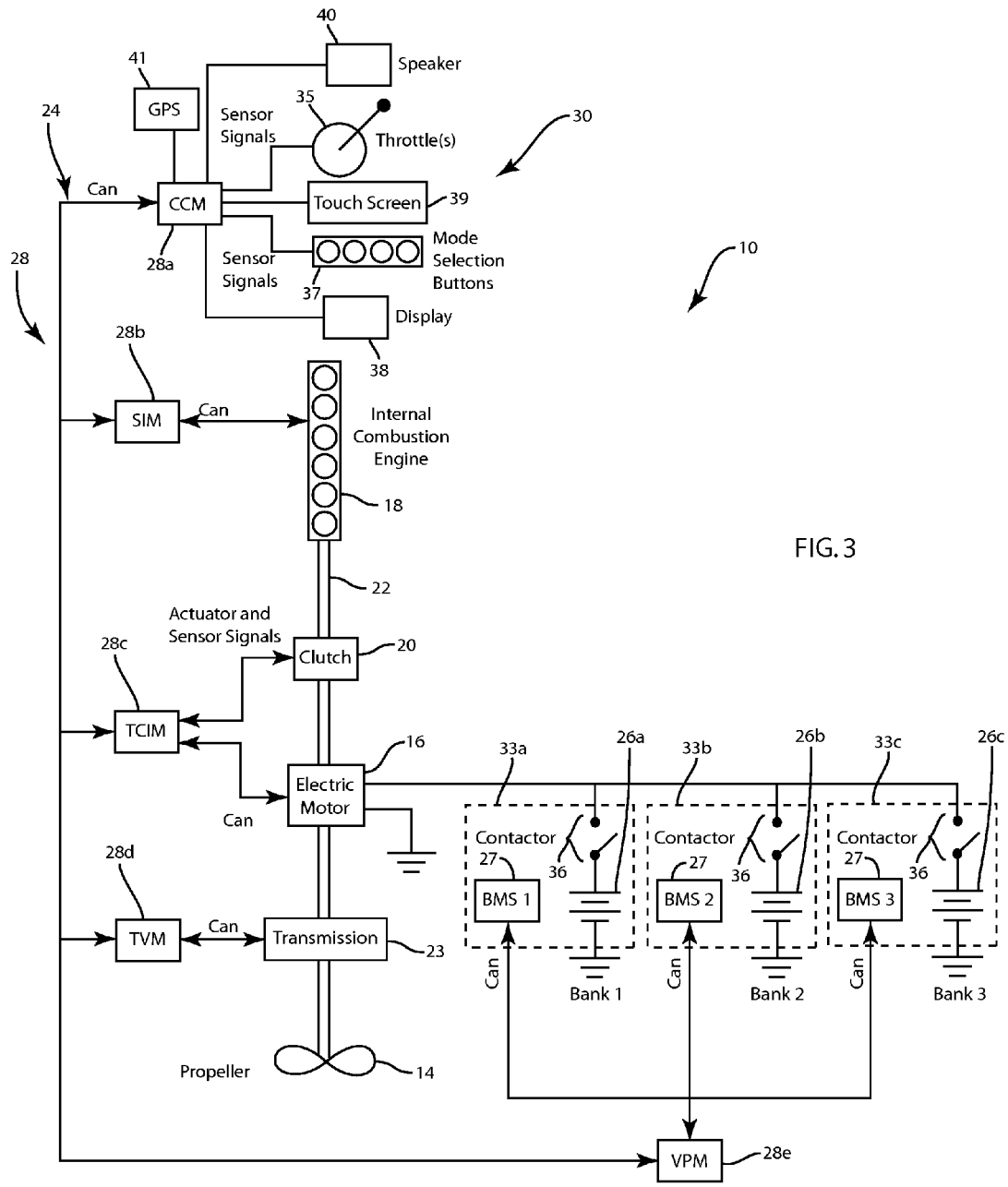
FIG. 3 is a schematic view of a hybrid marine propulsion system.

Referring to FIG. 3, the system 10 also includes a control circuit 28 having a programmable processor and optionally having a memory. The control circuit 28 comprises a controller area network 24 (CAN) for operating the system 10 in a plurality of operational modes. The control circuit 28 is shown schematically and includes a plurality of control circuit sections 28a-28e, each section optionally having a memory and processor for sending and receiving electronic control signals, for communicating with other control circuits in the CAN 24, and for controlling operations of certain components in the system 10 such as the engine 18, clutch 20, and motor 16. The programming and operations of the control circuit 28 and its sections 28a-28e are described in further detail below with respect to non-limiting examples and/or algorithms. While each of these examples/algorithms includes a specific series of steps for accomplishing certain system control functions, the scope of this disclosure is not intended to be bound by the literal order or literal content of steps described herein, and non-substantial differences or changes still fall within the scope of the disclosure. Also, the configuration of the control circuit 28 and sections 28a-28e can vary significantly. For example, the control circuit 28 does not need to include separately located sections and can instead comprise a single control device located at one location and excluding the CAN 24. Conversely the control circuit 28 can include more sections than those shown and sections located at different locations than those shown and interconnected by a CAN or other communication means.

In the example shown, the control circuit 28 includes a command control section 28a (CCM) that is configured to receive user inputs via the CAN 24 from a user input device 30. The user input device 30 is shown in FIGS. 1 and 2 as a conventional combination throttle/shift lever 35 and in FIG. 3 as including a plurality of mode selection buttons 37 and an input touch screen 39; however, the user input device 30 is not limited to these configurations and can additionally or alternately comprise other devices for inputting commands to the system 10, such as fewer or more input buttons and/or keys than that shown, joysticks, touch screens, and/or the like. Actuation of the user input device 30 is sensed by conventional sensors (not shown) and communicated to command control section 28a via the CAN 24.

The command control section 28a is programmed to convert the user inputs into electronic commands and then send the commands to other control circuit sections in the system 10. In this example, the other control circuit sections include a transmission/engine control circuit (SIM) 28b that controls engine/transmission/shifting and reads signals regarding transmission state and output speed; a thermal, clutch motor interface module (TCIM) 28c that controls the cooling system, clutch 20, and provides communication interface between the CAN 24 and a control circuit section (not shown) for the motor 16; and a drive control module (TVM) 28d that receives commands from the CCM 28a and controls for example a pod drive to a particular steering angle. Again, the control circuit 28 shown in FIG. 3 is exemplary and could be significantly changed and still fall within the scope of the present disclosure and achieve the system functional activities set forth herein.

During operation of the marine vessel 12, the control circuit 28 is programmed to switch amongst at least three modes of control, namely (1) an Engine Mode, wherein the engine 18 is connected to the propulsor 14 by the clutch 20 and all of the driving force to the propulsor 14 is provided by the engine 18; (2) an Electric Mode, wherein the motor 16 is connected to the propulsor 14 and all of the driving force to the propulsor 14 is provided by the motor 16; and (3) a Hybrid Mode, including either or both of a Hybrid Assist Mode wherein both the engine 18 and the motor 16 are connected to the propulsor 14 and the driving force to the propulsor 14 is provided by a combination of the engine 18 and the motor 16, and a Hybrid Regeneration Mode wherein the motor 16 is controlled to perform as a generator, thereby providing a recharge current to the batteries 26a, 26b, 26c. The latter situation occurs, for example, when both the motor 16 and engine 18 are connected in parallel via the driveshaft 22. Which mode of operation is utilized at any given time can be based upon user inputs provided by the user input device 30, or alternately can depend upon an operator-desired future performance capability of the system 10 and/or specific operating conditions of the vessel 12, as described further herein below.

The system 10 disclosed herein is configured to provide switching between the various modes of operation while the engine 18 is running and/or while the motor 16 is running and with the propulsor 14 in neutral or in gear. For example, it is often desirable to switch into Electric Mode when operating the vessel 12 at low speeds to thereby provide quieter vessel operation and more fuel-efficient vessel operation. It is often desirable to switch into Hybrid Regeneration Mode when the power of the plurality of batteries 26a, 26b, 26c is low to thereby draw recharging current from the engine 18.

Referring to FIG. 3, each battery 26a, 26b, 26c is part of a battery bank 33a, 33b, 33c that also includes a monitor 27 (BMS) that reads signals from the individual batteries and a contactor 36 that is configured to connect and disconnect the respective battery 26a, 26b, 26c from the system 10. Each contactor 36 is configured such that if for example more than a predetermined amount of current is received by that respective battery during recharging or if the battery discharges more than a predetermined amount of current to the system 10 to power the motor 16, the contactor 36 opens and the battery is disconnected from the system 10. Optionally, the system can be configured to prevent disconnection of the respective batteries according to the principles disclosed in copending U.S. patent application Ser. No. 12/849,549; however, this is not required.

The marine vessel 12 can also include at least one GPS receiver 41. The GPS receiver 41 optionally can have its own microprocessor having computer readable medium and executable code, as well as a memory. An example of a suitable GPS receiver is the Maretron GPS200; however, other types of GPS receivers are available and would work with the systems and methods described herein. The GPS receiver 41 is configured to receive GPS satellite signals and calculate the current global position of the marine vessel 12, as well as the current speed of the marine vessel in terms of speed over ground (SOG) and course over ground (COG) and communicate this information to the control circuit 28. This type of GPS receiver and control circuit configuration is well known to those having ordinary skill in the art.

The control circuit 28 is also configured to display on the touch screen 39 information regarding the current global position and operational characteristics of the marine vessel 12. Alternately, the control circuit 28 could be configured to display the information on another display such as a standard video display and/or the like. The type of display can vary and is not critical.

As stated above, the present inventors have realized through experimentation that it would be beneficial to provide improved hybrid marine propulsion systems and methods of operating such systems that better optimize the use of fuel and electricity, to thereby reduce cost and/or provide more environmentally favorable advantages. For example, although the hybrid marine propulsion systems in the prior art provide for switching between various operational modes, the inventors have realized that simply using the most readily available or least expensive mode at any given time may not necessarily achieve the most efficient and/or least expensive use of the system over a period time. The present inventors thus invented the presently disclosed and claimed systems and methods, which account for and achieve at least one operator-desired future performance capability of hybrid marine propulsions systems.

In one example, the control circuit 28 is programmed and configured to control operation of the system 10 according to a plurality of modes, which comprises at least the above-described Electric Mode wherein the electric motor 16 powers the marine propulsor 14 and the above referenced Hybrid Regeneration Mode wherein the internal combustion engine 18 powers the marine propulsor 14 and provides power for recharging the batteries 26a, 26b, 26c. In this example, the user input device 30 is configured to receive and input to the control circuit 28 an operator-desired future performance capability of the system 10. The type of "operator-desired future performance capability" can vary. In several of the examples provided below the future performance capability includes a desired future state of charge of at least one of the batteries 26a, 26b, 26c. The operator-desired future performance capability of the system 10 can be inputted via the touch screen 39 of the input device 30; however other types of input means can be utilized such as keyboards, push buttons, switches, voice activated controllers, and/or the like. The operator-desired future performance capability is communicated to the control circuit 28, and for example to the CCM 28a via the CAN 24. The input provided at the input device 30 can be provided to the user in an example where the user can select between several different future performance capabilities. Alternatively, the user can directly input a future performance capability to the input device 30 without being provided with options to choose from.

Based upon the inputted operator-desired future performance capability, the control circuit 28 is programmed and configured to select and execute modes of the above described plurality of modes (e.g. Electric Mode, Hybrid (Regeneration or Assist) Mode, and/or the like) so that the system ultimately provides the user with the operator-desired future performance capability. In one example, the control circuit 28 performs the steps of selecting and executing the plurality of modes so as to provide the operator-desired future performance capability based at least on a present operational characteristic of the system 10. The "present operational characteristic" of the system 10 can include, for example, one or more characteristics including a threshold state of charge of the battery 26 at which the control circuit 28 switches operation of the system 10 from the Electric Mode to the Hybrid Regeneration Mode. In another example, the present operational characteristic can include a threshold state of charge at which the control circuit 28 switches operation of the system 10 from the Hybrid (Regeneration or Assist) Mode to the Electric Mode. In another example, the present operational characteristic can include a present speed of the marine vessel 12. In a further example, the present operational characteristic can include a present amount of current being drawn from the battery 26 by the system 10. In another example, the present operational characteristic of the system 10 can include a present global position of the marine vessel 12. Combinations of the above examples can together constitute the present operational characteristic.

In other examples, the control circuit 28 selects and executes the plurality of modes so as to provide the operator-desired future performance capability based at least on a "user-desired destination global position" of the marine vessel 12 such as a GPS destination position. In another example, the control circuit 28 selects and executes the plurality of modes so as to provide the operator-desired future performance capability based at least on a "state of power source available at a user-desired destination", such as a source of charge available at a dock.

The above described examples of "future performance capabilities" and "operational characteristics of the system" are exemplary and are not limiting on the basic concept of the present disclosure. It is possible and contemplated for the control circuit 28 to be configured to select and execute modes of the plurality of modes based upon other types of characteristics of the system to achieve the above described or other operator-desired future performance capabilities.

The concepts of the present disclosure and various configurations of the control circuit 28 are more easily explained with reference to several exemplary methods. FIGS. 4-8 disclose such exemplary methods, which are not intended to be limiting on the generic concepts disclosed and claimed herein.

Figure 4:
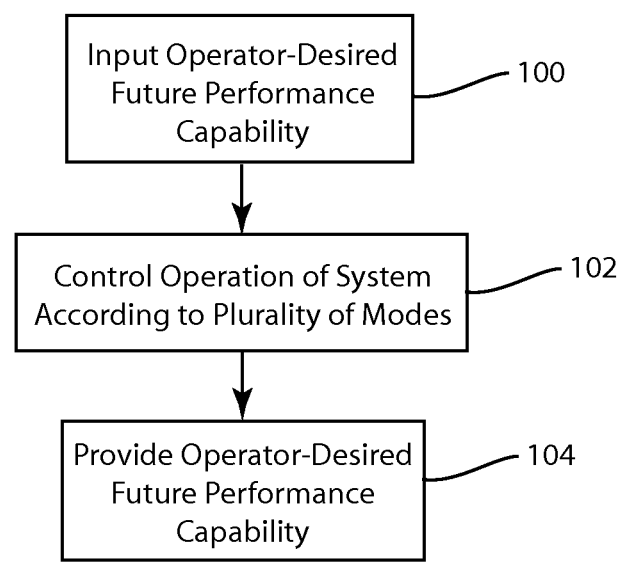
FIG. 4 is a flow chart illustrating one example of a method of operating a propulsion system for a marine vessel.

FIG. 4 depicts one example of a method of operating a marine propulsion system, such as the above-described system 10, having an internal combustion engine and an electric motor that is powered by one or more batteries, wherein the internal combustion engine and the electric motor each selectively power a marine propulsor to propel a marine vessel. The method comprises at step 100, inputting to a control circuit an operator-desired future performance capability of the hybrid marine propulsion system. As described above, the type of "operator-desired future performance capability" can vary and can include a desired future state of charge of at least one of the one or more batteries. As described above, input can be accomplished via a user input device, such as a touch screen, keyboard, joystick, push buttons, switches and/or the like. At step 102, the control circuit is operated to control operation of the system according to a plurality of modes including at least an Electric Mode wherein the electric motor powers the marine propulsor and a Hybrid Regeneration Mode wherein the internal combustion engine powers the marine propulsor and provides power for recharging the battery. Switching between the various modes is undertaken by the control circuit, as shown at step 104, so as to provide the operator-desired future performance capability.

Figure 5:
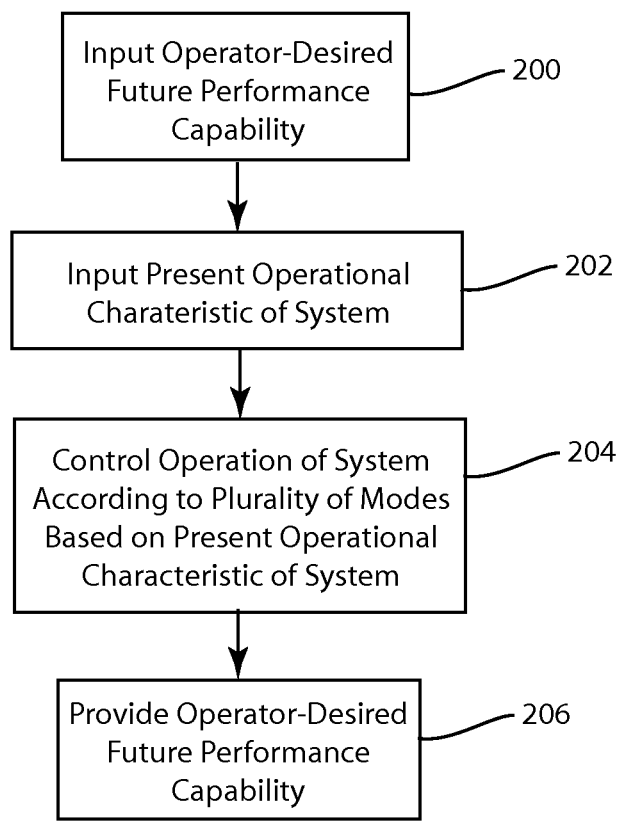
FIG. 5 is a flow chart illustrating another example of a method of operating a propulsion system for a marine vessel.

FIG. 5 depicts another example of a method of operating a marine propulsion system, such as the above-described system 10, having an internal combustion engine and an electric motor that is powered by one or more batteries, wherein the internal combustion engine and the electric motor each selectively power a marine propulsor to propel a marine vessel. The method comprises, at step 200, inputting to a control circuit an operator-desired future performance capability of the hybrid marine propulsion system. As described above, the type of "operator-desired future performance capability" can vary and can include a desired future state of charge of at least one of the one or more batteries. As described above, input can be accomplished via a user input device, such as a touch screen, keyboard, joystick, push buttons, switches and/or the like. At step 202, a present operational characteristic of the system is inputted to the control circuit. As described above, the "present operational characteristic" of the system can include, for example, one or more characteristics including a threshold state of charge of the one or more batteries at which the control circuit switches operation of the system from the Electric Mode to the Hybrid Regeneration Mode. In another example, the present operational characteristic can include a threshold state of charge at which the control circuit switches operation of the system 10 from the Hybrid Regeneration Mode to the Electric Mode. In another example, the present operational characteristic can include a present speed of the marine vessel. In a further example, the present operational characteristic can include a present amount of current being drawn from the battery by the system. In another example, the present operational characteristic of the system 10 can include a present global position of the marine vessel. Combinations of the above examples can together constitute the present operational characteristic. The operational characteristic of the system can be input via an input device, such as the above-described touch screen, keyboard, joystick, push buttons, switches and/or the like. Alternately, the operational characteristic of the system can be a monitored characteristic such as global position and/or speed of the marine vessel monitored by the GPS. Other operational characteristics of the system can also be monitored by known devices and provided to the control circuit for completion of step 202, as would be understood by those having ordinary skill in the art. At step 204 the control circuit is operated to control the system according to a plurality of modes including at least an Electric Mode wherein the electric motor powers the marine propulsor and a Hybrid Regeneration Mode wherein the internal combustion engine powers the marine propulsor and provides power for recharging the battery. At step 206, the control circuit is operated to select and execute the plurality of modes so as to provide the operator-desired future performance capability.

Figure 6:
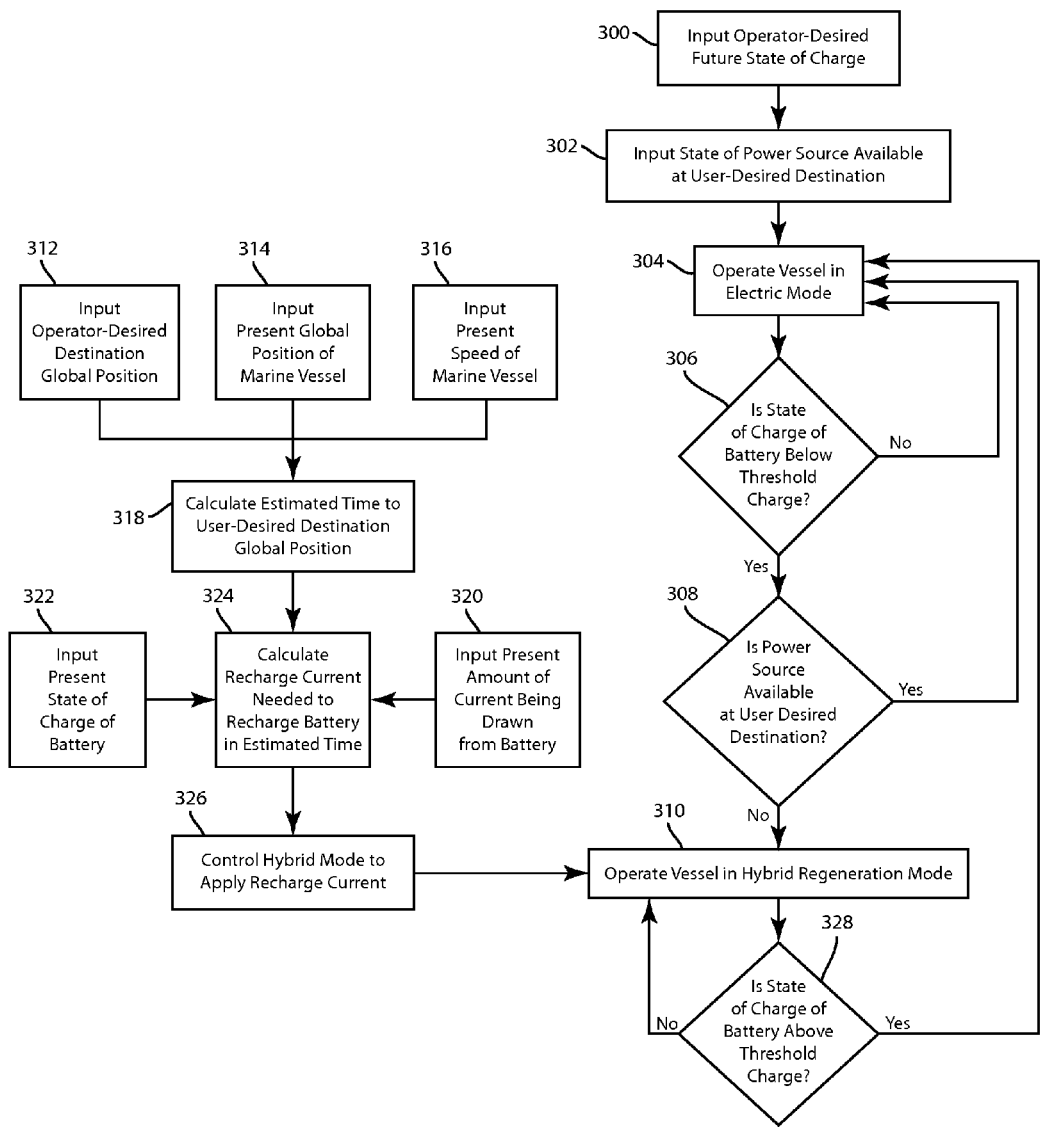
FIG. 6 is a flow chart illustrating another example of a method of operating a propulsion system for a marine vessel.
Figure 7:
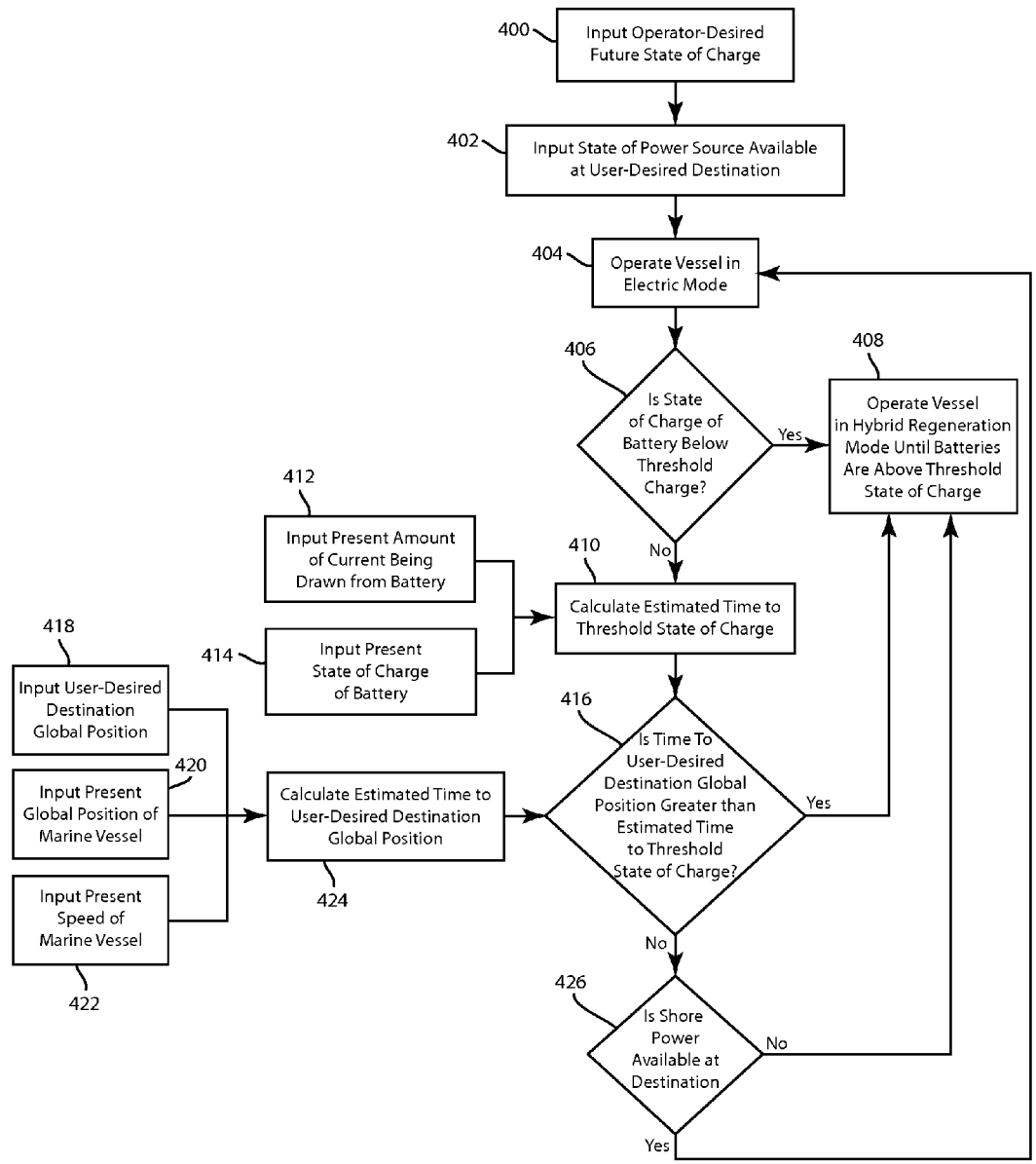
FIG. 7 is a flow chart illustrating another example of a method of operating a propulsion system for a marine vessel.
Figure 8:
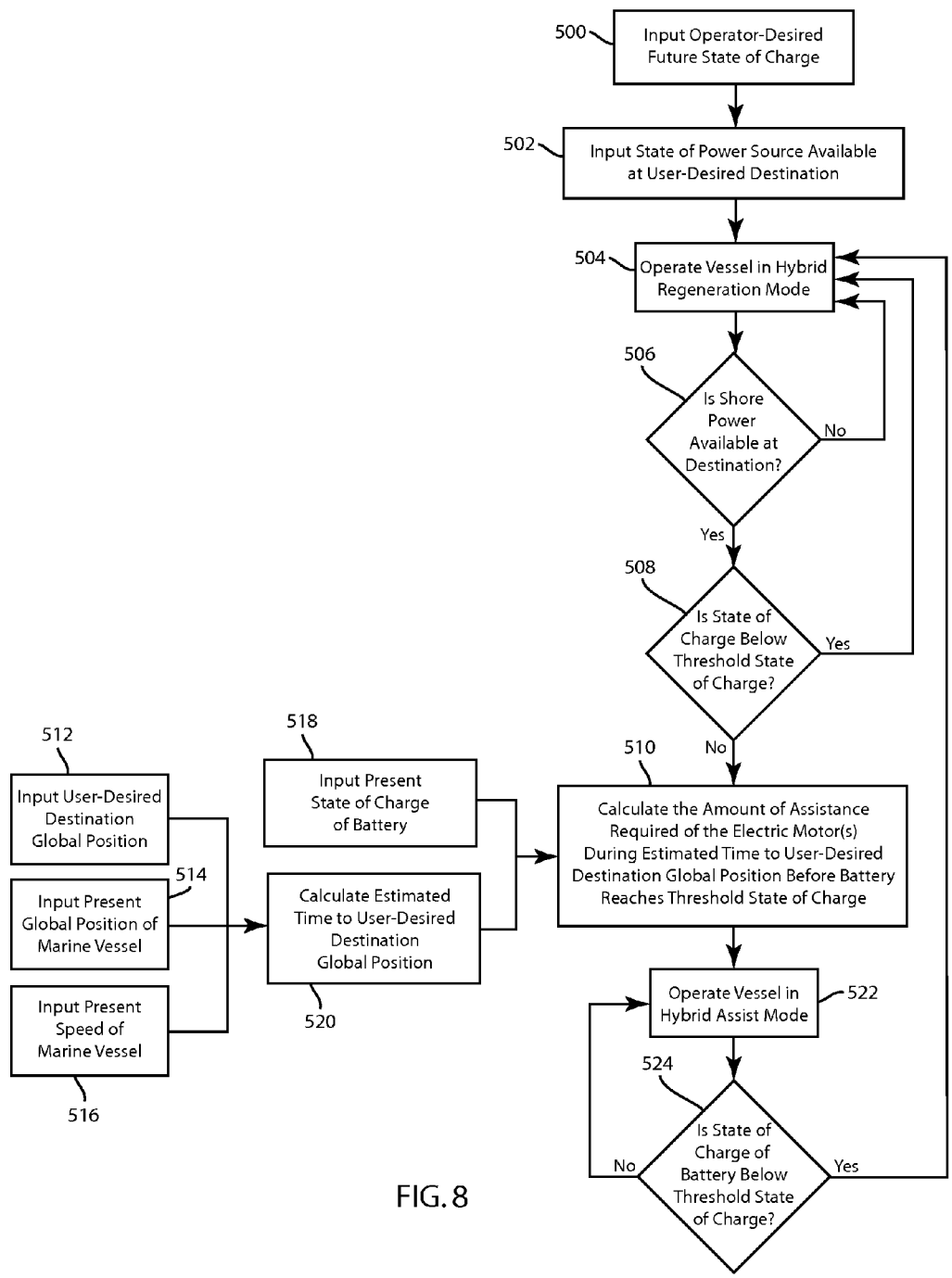
FIG. 8 is a flow chart illustrating another example of a method of operating a propulsion system for a marine vessel.

As discussed above, in the methods depicted in FIGS. 4 and 5, the "future performance capability" and "operational characteristic of they system" can vary. FIGS. 6-8 provide further exemplary methods according to this premise.

FIG. 6 depicts another example of a method of operating a marine propulsion system, such as the system 10 disclosed herein, having an internal combustion engine and an electric motor that is powered by one or more batteries, wherein the internal combustion engine and the electric motor each selectively power a marine propulsor to propel a marine vessel. The example shown in FIG. 6 demonstrates how the system can operate so as to efficiently utilize electricity and fuel in a situation where a user wants to use the marine vessel for an extended time in the future, such as, for example, at an overnight destination). This example includes the situation where the state of power source (or lack thereof) at the destination is known or assumed. The method comprises at step 300 inputting to a control circuit an operator-desired future performance capability of the hybrid marine propulsion system. As described above, the type of "operator-desired future performance capability" can vary and can include a desired future state of charge of at least one of the one or more batteries. As described above, this can be accomplished via a user input device, such as a touch screen, keyboard, joystick, push buttons, switches and/or the like. At step 302, a state of a power source available at a user-desired destination is inputted to the control circuit. This information can be provided by, for example, the user via one of the above-described input devices. Alternately, this information can be preprogrammed into the control circuit or GPS. At step 304, the control circuit operates the marine vessel in Electric Mode such that the electric motor powers the marine propulsor to propel the marine vessel. As the vessel is operated in Electric Mode, at step 306, the control circuit (such as via the control section 28c and monitor 27 described above) is programmed to monitor the state of charge of the one or more batteries powering the electric motor to determine whether the batteries have a state of charge that is below a threshold state of charge. An exemplary threshold state of charge can be 90 percent of full charge. If the actual state of charge of the one or more batteries is not below the threshold state of charge, step 304 is continued. Once the state of charge of the one or more batteries drops below the threshold state of charge, at step 308, the control circuit is programmed to ascertain whether a power source is available at the user-desired destination, which information is known from step 302. If yes, step 304 is continued. If no, at step 310, the control circuit switches the operational mode to operate the marine vessel in Hybrid Regeneration Mode, wherein the one or more batteries are recharged via power from the internal combustion engine.

Prior to or when step 310 is undertaken, at step 312, the user-desired destination global position is inputted to the control circuit. As described above, this can be accomplished via a user input device, such as a touch screen, keyboard, joystick, push buttons, switches and/or the like. Alternately, this can be accomplished via a GPS. At step 314, the present global position of the marine vessel is inputted to the control circuit and at step 316, the present speed of the marine vessel is inputted to the control circuit. Steps 314 and 316 can be accomplished via the GPS, such as the GPS 41 described above. At step 318, the control circuit is configured to calculate the estimated time to the user-desired destination global position, as inputted at step 312, based upon the present global position of the marine vessel and present speed of the marine vessel inputted at steps 314 and 316. The control circuit can utilize the following equations at step 318:

Knowns:
 1. Destination Latitude (dest_lat)
 2. Destination Longitude (dest_long)
 3. Current Latitude of the Vessel (current_lat)
 4. Current Longitude of the Vessel (current_long)
 5. Current Vessel Speed (curr_velocity)
 6. Radius of the Earth ($R_{earth}$=6367 km)

Unknowns:
 1. Distance to Destination (D)
 2. Time to Destination (t)

Formulas:

$$\text{lat\_diff} = \text{dest\_lat} - \text{current\_lat}$$

$$\text{long\_diff} = \text{dest\_long} - \text{current\_long}$$

$$D = R_{earth} * 2 * \arcsin\left(\sqrt{\sin^2(\text{lat\_diff}/2) + \cos(\text{curr\_lat}) * \cos(\text{dest\_lat}) * \sin^2(\text{long\_diff}/2)}\right)$$

$$t = \frac{D}{\text{curr\_velocity}}$$

Where "*t*" is the estimated time to the user-desired destination global position.

At step 320, the control circuit is configured to monitor and receive the present amount of current being drawn from the one or more batteries and at step 322, the control circuit is configured to monitor and receive the present state of charge of the one or more batteries. These steps can be accomplished via many different monitoring systems known in the art, including, for example, the system shown in FIG. 3. Based upon inputs from steps 318, 320 and 322, the control circuit is configured, at step 324, to calculate the recharge current needed to recharge the battery in the estimated travel time to reach the user-desired destination global position. The control circuit can utilize the following equation at step 324:

Knowns:
 1. Amp-hour rating of the batteries (C) (specified by the battery manufacturer)
 2. Current Battery State of Charge (SOCi)
 3. Desired Battery State of Charge at Destination (SOCf)
 4. Peurket's constant for pack (k) (specified by the battery manufacturer)
 5. Estimated Travel Time (t)
 6. Time at which rating was taken (H) (specified by the battery manufacturer)

Unknowns:
 1. Recharge current (i)

$$i = \frac{(SOC_i - SOC_f)C}{100\ H\left(\frac{t}{H}\right)^{\frac{1}{k}}}$$

SOCi (%) = Current State of Charge
SOCf (%) = Desired State of Charge at Destination
C (Ah) = Amp Hour rating of pack (specified by battery manufacturer)
H (h) = Time at which rating was taken (specified by battery manufacturer)
k = Peukert's constant for pack (specified by battery manufacturer)
t (h) = Travel time allowed
i (Amps) = if SOCi < SOCf, minimum charge current
 = if SOCi > SOCf, maximum discharge current Peukert's constant should be in the 1.2 range depending on the pack.

At step 326, the control circuit controls the system in Hybrid Regeneration Mode so as to apply the recharge current to the one or more batteries. At step 328, the control circuit is configured to monitor the state of charge of the battery to determine whether it is above the aforementioned threshold charge. If no, step 310 is continued. If yes, step 304 is undertaken, wherein the control circuit switches modes to operate the vessel in the Electric Mode.

FIG. 7 depicts another example of a method of operating a marine propulsion system, such as the system 10 disclosed above, having an internal combustion engine and an electric motor that is powered by one or more batteries, wherein the internal combustion engine and the electric motor each selectively power a marine propulsor to propel a marine vessel. FIG. 7 depicts one example of efficiently controlling the aforementioned system in a situation where an alternative recharge source (e.g. shore power source) is available at the user-desired destination and the present user demand on the system is less than a predetermined threshold state of charge for switching from Engine Mode to Electric Mode. This example is useful for example when a user is returning the marine vessel to a dock having a power source and the user desires to use electricity in lieu of fuel. As shown in FIG. 7, the method comprises at step 400, inputting of an operator-desired future state of charge. As described above, the type of "operator-desired future performance capability" can vary and can include a desired future state of charge of at least one of the one or more batteries. This can be inputted via an input device, such as the above-described touch screen, keyboard, joystick, push buttons, switches and/or the like. Alternately, the future state of charge can be associated with a particular mode selected by the user, wherein the mode defines a desired state of charge of one or more batteries associated with the motor. At step 402, a state of power source available at a user-desired destination is inputted to the control circuit. As with the example shown in FIG. 6, the user-desired destination can be inputted manually or can be stored in association with, for example, global position information in a GPS. At step 404, the control circuit operates the vessel in electric mode, wherein the propulsor is powered by the electric motor, which in turn is powered by the one or more batteries. At step 406, the control circuit is programmed to monitor (via, for example, section 28e and monitor 27) the one or more batteries and determine whether the state of charge of the battery (ies) is below a threshold state of charge. The threshold state of charge can vary and in this example typically represents the lowest (critical) state of charge upon which it is necessary to operate the engine and recharge the one or more batteries in Hybrid Regeneration Mode. An example of the threshold state of charge could be 10 percent of total charge of the batteries. If yes, the control circuit operates the vessel in Hybrid Regeneration Mode until the state of charge of the battery(ies) is above the threshold state of charge, at step 408. Thereafter, the control circuit undertakes step 404 to operate the vessel in Electric Mode. If no, at step 410, the control circuit is programmed to calculate the estimated time it will take to reach the threshold state of charge. This is calculated based upon the present amount of current being drawn from the battery(ies), input at step 412 and the present state of charge of the battery(ies) input at step 414.

At step 416, the control circuit is configured to determine whether the time it will take for the marine vessel to reach the user-desired destination global position entered at step 402 is greater than the estimated time it will take the system under current operational conditions to discharge the batteries to reach a threshold state of charge, as calculated at step 410. The control circuit can utilize the following equation at step 410:

Knowns:
1. Amp-hour rating of the batteries (C) (specified by the battery manufacturer)
2. Current Battery State of Charge ($SOC_i$)
3. Desired Battery State of Charge at Destination ($SOC_f$)
4. Peurket's constant for pack (k) (specified by the battery manufacturer)
5. Estimated Travel Time (t)
6. Time at which rating was taken (H) (specified by the battery manufacturer)
7. Current draw (i)

Unknowns:
1. Estimate time to Threshold SOC (t)

$$t = H\left[\frac{\left(\frac{SOC_i - SOC_f}{100}\right)*C}{i*H}\right]^k$$

Where "t" is the estimated time for the batteries to each the threshold SOC ($SOC_f$).

The calculation made at step 416 is based upon several inputs provided at steps 418, 420, 422 and 424. Specifically, at step 418, a user-desired destination global position is input to the control circuit. As described above, this can be accomplished via a user input device, such as a touch screen, keyboard, joystick, push buttons, switches and/or the like. At step 420, the present global position of the marine vessel is inputted. This can be accomplished, for example, by the GPS. At step 422, the present speed of the marine vessel is inputted to the control circuit. This also can be accomplished via the GPS. At step 424, the control circuit is configured to calculate the estimated time to the user-desired destination global position based upon the data provided at steps 418-422. The control circuit can utilize the following equations at step 424:
Knowns:

1. Destination Latitude (dest_lat)
2. Destination Longitude (dest_long)
3. Current Latitude of the Vessel (current_lat)
4. Current Longitude of the Vessel (current_long)
5. Current Vessel Speed (curr_velocity)
6. Radius of the Earth ($R_{earth}$=6367 km)

Unknowns:
1. Distance to Destination (D)
2. Time to Destination (t)

Formulas:

$$lat\_diff = dest\_lat - current\_lat$$

$$long\_diff = dest\_long - current\_long$$

$$D = R_{earth} * 2 * \arcsin\left(\sqrt{\sin^2(lat\_diff/2) + \cos(curr\_lat) * \cos(dest\_lat) * \sin^2(long\_diff/2)}\right)$$

$$t = \frac{D}{curr\_velocity}$$

Where "t" is the estimated time to the user-desired destination global position.

At step 426, the control circuit is configured to determine whether shore power is available at destination, as inputted at step 402. If no, the control circuit operates the vessel in Hybrid Regeneration Mode until the battery(ies) have a state of charge that is above the threshold state of charge, at step 408. If yes, the control circuit operates the vessel in electric mode, at step 404. Once the battery(ies) have a state of charge that is above the threshold state of charge at step 408, the control circuit operates the vessel in electric mode at step 404.

FIG. 8 depicts another example of a method of operating a marine propulsion system, such as the system 10 disclosed above, having an internal combustion engine and an electric motor that is powered by one or more batteries, wherein the internal combustion engine and the electric motor each selectively power a marine propulsor to propel a marine vessel. The method in FIG. 8 can be particularly useful when the user has placed a performance demand on the system that will exceed a predetermined threshold for switching from engine mode to electric mode, and further when there is a source of power available at a user-desired global position destination, such as at a dock. At step 500, an operator-desired future state of charge of the one or more batteries powering the electric motor is input to the system. As described above, the type of "operator-desired future performance capability" can vary and can include a desired future state of charge of at least one of the one or more batteries. As described above, this can be accomplished via a user input device, such as a touch screen, keyboard, joystick, push buttons, switches and/or the like. Alternately, the operator-desired future state of charge can be associated with a particular mode operated by the user and not directly entered via the input device. At step 502, a state of power source available at the user-desired destination is inputted to the control circuit. Again, this can be accomplished via the above-noted input devices. Alternately, it can be associated with a global position selected by the user, wherein the global position has associated with it a known state of power source. This information can be stored in a GPS or in the control circuit. At step 504, the control circuit operates the marine vessel in Hybrid Regeneration Mode so as to provide the performance desired and provide generation for recharging the one or more batteries powering the electric motor. At step 506, the control circuit is configured to determine whether shore power is available at the destination, as input at step 502. If no, the control circuit operates the vessel in Hybrid Regeneration Mode at step 504. If yes, the control circuit is configured to determine, at step 508, whether the actual state of charge of the batteries powering the electric motor is below a threshold state of charge. The threshold state of charge can represent an absolute lowest state of charge threshold upon which engine power for recharging the one or more batteries is required. An example of such a threshold charge can be 10 percent of total charge. If yes, the control circuit operates the vessel in Hybrid Regeneration Mode at step 504. If no, the control circuit proceeds to step 510 at which the amount of assistance required of the electric motors during the estimated time to user-desired destination global position before the battery reaches the threshold state of charge is calculated. This calculation is made based upon inputs provided to the control circuit as follows:

Knowns:
1. Amp-hour rating of the batteries (C)
2. Current Battery State of Charge (SOCi)
3. Desired Battery State of Charge at Destination (SOCf)
4. Peurket's constant for pack (k)
5. Estimated Travel Time (t)
6. Hybrid Battery Pack Voltage (V)
7. Electric Motor Speed (RPM)
8. Time at which rating was taken (H) (specified by the battery manufacturer)

Unknowns:
1. Recharge current (i)
2. Electric Motor Assistance (Torq)

Step 1: Calculate the amount of current to draw to reach the desired SOC in the time available $$i = \frac{(SOC_i - SOC_f)C}{100\, H\left(\frac{t}{H}\right)^{\frac{1}{k}}}$$

SOCi (%) = Current State of Charge
SOCf (%) = Desired State of Charge at Destination
C (Ah) = Amp Hour rating of pack (specified by battery manufacturer)
H (h) = Time at which rating was taken (specified by battery manufacturer)
k = Peukert's constant for pack (specified by battery manufacturer)
t (h) = Travel time allowed
i (Amps) = if SOCi < SOCf, minimum charge current
= if SOCi > SOCf, maximum discharge current Peukert's constant should be in the 1.2 range depending on the pack.

Step 2: Calculate the amount of assistance (torque request) the electric motors need to provide to draw the current specified in Step 1.

$$\text{Torq} = \frac{i * V * \left(\frac{60}{2*\pi}\right)}{RPM}$$

This torque request of the electric motor to discharge the battery to the required state of SOC in the time remaining to the destination At step 512, a user-desired destination global position is input to the control circuit. As described above, this can be accomplished via a user input device, such as a touch screen, keyboard, joystick, push buttons, switches and/or the like. At step 514, the present global position of the marine vessel is input to the control circuit and at step 516, the present speed of the marine vessel is input to the control circuit. These steps can be accomplished, for example, by a GPS. At step 520, the control circuit is configured to calculate the estimated time to user-desired destination global position based upon the inputs provided at steps 512-516. The control circuit can make the calculation at step 520 based upon the following equation:

Knowns:
1. Destination Latitude (dest_lat)
2. Destination Longitude (dest_long)
3. Current Latitude of the Vessel (current_lat)
4. Current Longitude of the Vessel (current_long)
5. Current Vessel Speed (curr_velocity)
6. Radius of the Earth ($R_{earth}$=6367 km)

Unknowns:
1. Distance to Destination (D)
2. Time to Destination (t)

Formulas:

$$\text{lat\_diff} = \text{dest\_lat} - \text{current\_lat}$$

$$\text{long\_diff} = \text{dest\_long} - \text{current\_long}$$

$$D = R_{earth} * 2 * \arcsin\left(\sqrt{\begin{array}{l}\sin^2(\text{lat\_diff}/2) + \cos(\text{curr\_lat}) *\\ \cos(\text{dest\_lat}) * \sin^2(\text{long\_diff}/2)\end{array}}\right)$$

$$t = \frac{D}{\text{curr\_velocity}}$$

Where "$t$" is the estimated time to the user-desired destination global position.

At step 518, the control circuit is configured to monitor and determine the present state of charge of the batteries. At step 522, the control circuit is configured to operate the marine vessel in Hybrid Assist Mode, wherein both the internal combustion engines and the electric motor provide power to the propulsor. At step 524, the control circuit is configured to determine whether the state of charge of the one or more batteries is below the threshold state of charge. If no, step 522 is continued. If yes, the control circuit is configured to operate the vessel in Hybrid Regeneration Mode at step 504, wherein charge is generated for the one or more batteries.

It will thus be seen by the examples given above that the present disclosure provides a hybrid propulsion system for a marine vessel that includes means for propelling the marine vessel and an internal combustion engine and electric motor combination that powers the means for powering the marine vessel. Control means is also provided for controlling operation of the system according to a plurality of modes comprising an Electric Mode wherein the electric motor powers the means for propelling the marine vessel and a Hybrid Mode wherein the internal combustion engine powers the means for propelling the marine vessel and also provides power for recharging a battery associated with the electric motor. Input means is provided for inputting to the control circuit an operator-desired future performance capability of the system. The control means is configured to select and execute modes of the plurality of modes so as to provide the operator-desired future performance capability.

What is claimed is:

1. A hybrid propulsion system for a marine vessel comprising:
   a marine propulsor that propels a marine vessel;
   an internal combustion engine that selectively powers the marine propulsor;
   an electric motor that selectively powers the marine propulsor, wherein the electric motor receives power from a battery;
   a control circuit that controls operation of the system according to a plurality of modes comprising an electric mode wherein the electric motor powers the marine propulsor and a hybrid mode wherein the internal combustion engine powers the marine propulsor and provides power for recharging the battery; and
   a user input device that inputs to the control circuit an operator-desired future performance capability of the system;
   wherein the control circuit selects and executes modes of the plurality of modes so as to provide the operator-desired future performance capability, wherein the operator-desired future performance capability comprises a future state of charge of the battery that is input by a user to the system via the user input device.

2. A hybrid propulsion system for a marine vessel comprising:
   a marine propulsor that propels a marine vessel;
   an internal combustion engine that selectively powers the marine propulsor;
   an electric motor that selectively powers the marine propulsor, wherein the electric motor receives power from a battery;
   a control circuit that controls operation of the system according to a plurality of modes comprising an electric mode wherein the electric motor powers the marine propulsor and a hybrid mode wherein the internal combustion engine powers the marine propulsor and provides power for recharging the battery; and
   a user input device that inputs to the control circuit operator-desired future performance capability of the system;
   wherein the control circuit selects and executes modes of the plurality of modes so as to provide the operator-desired future performance capability, wherein the operator-desired future performance capability comprises a future state of charge of the battery;
   wherein the control circuit selects and executes the plurality of modes so as to provide the future state of charge of the battery at a user-desired destination global position of the marine vessel that is input by a user to the system via the user input device.

3. A hybrid propulsion system according to claim 2, wherein the future state of charge is a minimum state of charge.

4. A hybrid propulsion system according to claim 2, wherein the future state of charge is a maximum state of charge.

5. A hybrid propulsion system for a marine vessel comprising:
   a marine propulsor that propels a marine vessel;
   an internal combustion engine that selectively powers the marine propulsor;
   an electric motor that selectively powers the marine propulsor, wherein the electric motor receives power from a battery;
   a control circuit that controls operation of the system according to a plurality of modes comprising an electric mode wherein the electric motor powers the marine propulsor and a hybrid mode wherein the internal combustion engine powers the marine propulsor and provides power for recharging the battery; and
   a user input device that inputs to the control circuit an operator-desired future performance capability of the system;
   wherein the control circuit selects and executes modes of the plurality of modes so as to provide the operator-desired future performance capability, wherein the operator-desired future performance capability comprises a future state of charge of the battery;
   wherein the control circuit selects and executes the plurality of modes so as to provide the operator-desired future performance capability based at least on a present operational characteristic of the system.

6. A hybrid propulsion system according to claim 5, wherein the present operational characteristic of the system comprises a threshold state of charge of the battery at which the control circuit switches operation of the system from the electric mode to the hybrid mode.

7. A hybrid propulsion system according to claim 5, wherein the present operational characteristic of the system comprises a threshold state of charge at which the control circuit switches operation of the system from the hybrid mode to the electric mode.

8. A hybrid propulsion system according to claim 5, wherein the present operational characteristic of the system comprises a present speed of the marine vessel.

9. A hybrid propulsion system according to claim 5, wherein the present operational characteristic of the system comprises a present amount of current being drawn from the battery by the system.

10. A hybrid propulsion system according to claim 5, wherein the present operational characteristic of the system comprises a present global position of the marine vessel.

11. A hybrid propulsion system according to claim 10, wherein the control circuit selects and executes the plurality of modes so as to provide the operator-desired future performance capability based at least on a user-desired destination global position of the marine vessel.

12. A hybrid propulsion system according to claim 5, wherein the control circuit selects and executes the plurality of modes so as to provide the operator-desired future performance capability based at least on a state of power source available at a user-desired destination.

13. A method of operating a marine propulsion system having an internal combustion engine and an electric motor that is powered by a battery, wherein the internal combustion engine and the electric motor each selectively power a marine propulsor to propel a marine vessel, the method comprising:
   operating a control circuit to control operation of the system according to a plurality of modes including at least an electric mode wherein the electric motor powers the marine propulsor and a hybrid mode wherein the internal combustion engine powers the marine propulsor and provides power for recharging the battery;
   inputting to the control circuit via a user input device an operator-desired future performance capability of the hybrid marine propulsion system; and
   selecting and executing with the control circuit the plurality of modes so as to provide the operator-desired future performance capability, wherein the operator-desired future performance capability comprises a future state of charge of the battery.

14. A method of operating a marine propulsion system having an internal combustion engine and an electric motor that is powered by a battery, wherein the internal combustion engine and the electric motor each selectively power a marine propulsor to propel a marine vessel, the method comprising:

operating a control circuit to control operation of the system according to a plurality of modes including at least an electric mode wherein the electric motor powers the marine propulsor and a hybrid mode wherein the internal combustion engine powers the marine propulsor and provides power for recharging the battery;

inputting to the control circuit an operator-desired future performance capability of the hybrid marine propulsion system; and selecting and executing with the control circuit the plurality of modes so as to provide the operator-desired future performance capability, wherein the operator-desired future performance capability comprises a future state of charge of the battery;

wherein the control circuit selects and executes modes of the plurality of modes so as to provide the future state of charge of the battery at a user-desired destination global position of the marine vessel that is input by a user to the system via the user input device.

15. A method according to claim 14, wherein the future state of charge is a minimum state of charge.

16. A method according to claim 14, wherein the future state of charge is a maximum state of charge.

17. A method of operating a marine propulsion system having an internal combustion engine and an electric motor that is powered by a battery, wherein the internal combustion engine and the electric motor each selectively power a marine propulsor to prowl a marine vessel, the method comprising:

operating a control circuit to control operation of the system according to a plurality of modes including at least an electric mode wherein the electric motor powers the marine propulsor and a hybrid mode wherein the internal combustion engine powers the marine propulsor and provides power for recharging the battery;

inputting to the control circuit an operator-desired future performance capability of the hybrid marine propulsion system;

selecting and executing with the control circuit the plurality of modes so as to provide the operator-desired future performance capability, wherein the operator-desired future performance capability comprises a future state of charge of the battery; and inputting to the control circuit a present operational characteristic of the system, and selecting and executing with the control circuit the plurality of modes so as to provide the operator-desired future performance capability based at least on the present operational characteristic of the system.

18. A method according to claim 17, wherein the present operational characteristic of the system comprises a threshold state of charge at which the control circuit switches operation of the system from the electric mode to the hybrid mode.

19. A method according to claim 17, wherein the present operational characteristic of the system comprises a threshold state of charge at which the control circuit switches operation of the system from the hybrid mode to the electric mode.

20. A method according to claim 17, comprising determining a present speed of the marine vessel and communicating the present speed to the control circuit, wherein the present operational characteristic of the system comprises the present speed of the marine vessel.

21. A method according to claim 17, comprising determining an amount of current being drawn from the battery and communicating the amount of current to the control circuit, wherein the present operational characteristic of the system comprises the amount of current.

22. A method according to claim 17, comprising determining a present global position of the marine vessel and communicating the present global position of the marine vessel to the control circuit; wherein the present operational characteristic of the system comprises the present global position of the marine vessel.

23. A method according to claim 22, comprising inputting a user-desired destination global position of the marine vessel to the control circuit and operating the control circuit to select and execute the plurality of modes so as to provide the operator-desired future performance capability based at least on the user-desired destination global position of the marine vessel.

24. A method according to claim 17, comprising inputting a state of a power source available at a user-desired destination to the control circuit and operating the control circuit to select and execute the plurality of modes so as to provide the operator-desired future performance capability based at least on the state of power source available at the user-desired destination.

* * * * *